United States Patent [19]

McDonald et al.

[11] Patent Number: 5,422,930
[45] Date of Patent: Jun. 6, 1995

[54] METHOD AND APPARATUS FOR SHARING RADIO FREQUENCY SPECTRUM IN A RADIO FREQUENCY COMMUNICATION SYSTEM

[75] Inventors: James A. McDonald, Buffalo Grove; Ross Ruthenberg, Wood Dale, both of Ill.

[73] Assignee: Motorola, Inc., Schaumburg, Ill.

[21] Appl. No.: 64,306

[22] Filed: May 20, 1993

[51] Int. Cl.$^6$ .................... H04M 11/00; H04Q 7/24; H04Q 7/28
[52] U.S. Cl. ........................ 379/58; 379/59; 455/33.1
[58] Field of Search ............ 379/58, 59, 61, 63; 455/33.1, 33.4, 56.1, 62, 63

[56] References Cited

U.S. PATENT DOCUMENTS 4,790,000 12/1988 Kinoshita .................. 379/59
5,335,278 8/1994 Matchett et al. .......... 455/33.1 X

OTHER PUBLICATIONS

"Personal Communications Services Spectrum Sharing with Private Microwave Services at 1850–1990 MHz", published by Motorola, Inc. of Schaumburg, Illinois in Jun. of 1991.

Primary Examiner—Curtis Kuntz
Assistant Examiner—G. J. Oehling
Attorney, Agent, or Firm—Kelly A. Gardner; Pablo Meles; John H. Moore

[57] ABSTRACT

A radio frequency communication system is coupled to a telephone network (130) having automatic number identification (ANI) capabilities for communication thereover. The radio frequency communication system includes at least one relocateable base station (115) which shares a radio frequency channel with stationary communication devices (105) for communicating over predetermined geographic areas (110). The radio frequency communication system further includes a service center (125) which, in response to a call from a base station (115), receives from the telephone network (130) information indicative of at least a portion of a telephone number from which the base station (115) is calling. The service center (125) determines therefrom whether the base station (115) is located within any of the predetermined geographic areas (110). When the base station (115) is not located within any of the predetermined geographic areas (110), the service center (125) transmits an authorization signal over the telephone network (130) indicating that the base station (115) is authorized for radio frequency communication over the shared radio frequency channel.

17 Claims, 8 Drawing Sheets

METHOD AND APPARATUS FOR SHARING RADIO FREQUENCY SPECTRUM IN A RADIO FREQUENCY COMMUNICATION SYSTEM

FIELD OF THE INVENTION

This invention relates in general to radio frequency communication systems, and more specifically to a radio frequency communication system in which the radio frequency spectrum is shared.

BACKGROUND OF THE INVENTION

Radio frequency communication systems are typically allocated a radio frequency spectra over which system users transmit and receive information. As the number of users of radio frequency communication systems increase, the usable radio frequency spectra is becoming increasingly scarce. In many regions of the United States, for example, the radio frequency spectrum set aside for cellular telephone users has already become saturated to such an extent that cellular subscribers must often wait for an available radio frequency channel. As the number of cellular subscribers increases, users will experience increasingly longer delays in obtaining an available channel.

In addition to existing systems, such as cellular systems, new two-way communication systems are planned which will require additional radio frequency spectrum. As these new systems are implemented, subscribers to the new systems will further crowd the usable radio frequency spectra.

One method for more efficiently utilizing the currently available radio frequency spectra is to share allocated radio frequencies between users of different radio frequency communication systems. A problem with this method is that the users of one communication system may sometimes interfere with the users of another communication system sharing the same radio frequencies. Accordingly, some known frequency sharing schemes allocate a radio frequency channel to one or more stationary users located in a first geographic area. The same radio frequency channel is then allocated to other stationary users located in a second geographic area that is far enough away from the first geographic area to prevent interference between the users of the two different systems. This frequency sharing scheme, however, is only workable for communication systems in which the users are stationary and do not roam into areas wherein interference will occur between users of the different systems.

Thus, what is needed is a frequency sharing scheme for mobile users that prevents interference between users of different communication systems sharing the same radio frequency channels.

SUMMARY OF THE INVENTION

According to an aspect of the present invention, a method for sharing a radio frequency channel among stationary communication devices for communicating over predetermined geographic areas and at least one base station capable of being relocated among a plurality of geographic regions, wherein the at least one base station is coupled to a service center via a telephone network having automatic number identification (ANI) capabilities, comprises the step of the at least one base station accessing the telephone network to couple to the service center. The method further comprises the steps of the telephone network transmitting to the service center information indicative of at least a portion of a telephone number from which the at least one base station is calling and the service center determining therefrom whether the base station is located within any of the predetermined geographic areas. The method still further comprises the step of the service center providing a first authorization signal to the at least one base station over the telephone network when the at least one base station is not located within any of the predetermined geographic areas, wherein the first authorization signal indicates that authorization of radio frequency communication over the radio frequency channel is allowed.

According to another aspect of the present invention, a base station is capable of being relocated among a plurality of geographic regions for communicating over a radio frequency channel and is further capable of accessing a telephone network to communicate thereover. The base station comprises a memory for storing a first predetermined telephone number and accessing circuitry coupled to the memory for calling the first predetermined number over the telephone network and for receiving in response thereto one of first and second authorization signals over the telephone network indicating, respectively, that authorization of radio frequency communication over the radio frequency channel is allowed or denied. The base station further comprises a transceiver coupled to the accessing circuitry for transmitting and receiving communications over the radio frequency channel in response to reception of the first authorization signal.

According to still another aspect of the present invention, a radio frequency communication system is coupled to a telephone network for communication thereover, wherein the telephone network has automatic number identification (ANI) capabilities. The radio frequency communication system shares a radio frequency channel with stationary communication devices which communicate on the radio frequency channel over predetermined geographic areas. The radio frequency communication system comprises at least one relocateable base station for calling the service center over the telephone network and for receiving therefrom one of first and second authorization signals indicating, respectively, that authorization of radio frequency communication over the radio frequency channel is allowed or denied. The at least one relocateable base station comprises a transceiver for communicating over the radio frequency channel in response to reception of the first authorization signal. The radio frequency communication system further comprises a service center for receiving from the telephone network information indicative of at least a portion of a telephone number from which the at least one relocateable base station is calling and for determining therefrom whether the at least one relocateable base station is located within any of the predetermined geographic areas. The service center transmits the first authorization signal to the at least one relocateable base station when the at least one relocateable base station is not located within any of the predetermined geographic areas.

DESCRIPTION OF A PREFERRED EMBODIMENT

Figure 1:
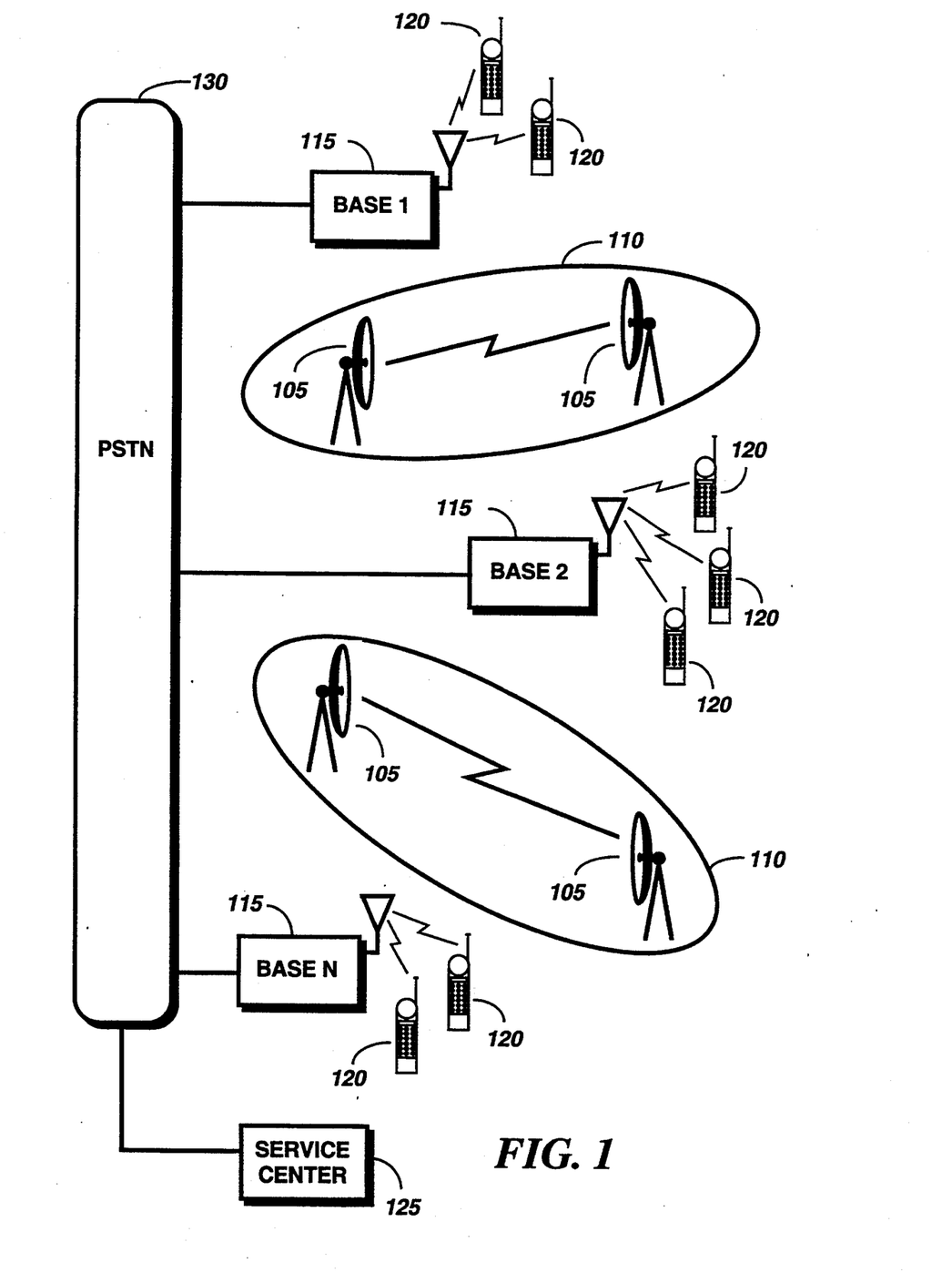
FIG. 1 is a block diagram of a radio frequency communication system which shares a radio frequency channel with stationary communication devices in accordance with a preferred embodiment of the present invention.

FIG. 1 is an illustration of a radio frequency (RF) communication system for sharing, in accordance with a preferred embodiment of the present invention, a predetermined RF channel with stationary point-to-point communication devices, such as microwave point-to-point stations 105 that have highly directional antennas. Each pair of microwave stations 105 communicate over predetermined geographic areas 110 in a manner that is well known to one of ordinary skill in the art. It will be appreciated that the predetermined geographic areas 110 depend in part on various factors including the output power of the transmitters at the respective locations, the height of the antennas, the direction of the antennas, the directional selectivity of the antennas, the surface features of the geographic areas 110 between the microwave stations 105, and the sensitivity of the receivers at the microwave stations 105.

Because the RF channel over which the microwave stations 105 communicate is utilized only over the predetermined geographic areas 110, regions surrounding the predetermined geographic areas 110 can be used to communicate on the same RF channel without interfering with the microwave stations 105. As a result, an RF communication system can share the RF channel if devices included therein do not interfere with the microwave stations 105. In other words, the devices included within the RF communication system are excluded from transmitting on the radio frequency channel within the predetermined geographic areas 110, hereafter referred to as "exclusion zones".

The RF communication system which shares the RF channel preferably includes a plurality of base stations 115 which are relocateable, i.e., which can be easily moved from one geographic region to another. The base stations 115 utilize the RF channel to communicate with a plurality of mobile units, such as portable telephone handsets 120. The portable handsets 120 may be, for example, handsets utilized in a CT-2 (second generation cordless telephone) communication system. As mentioned above, the base stations 115 and the portable handsets 120 preferably do not communicate while located within the exclusion zones utilized by the microwave stations 105, thereby preventing interference between the RF communication system and the microwave stations 105.

The RF communication system further comprises a service center 125, which is coupled to each of the base stations 115 by a telephone network, e.g., the public switched telephone network (PSTN) 130, having automatic number identification (ANI) capabilities, a feature which is well known to one of ordinary skill in the art. The service center 125 communicates over the PSTN 130 with each base station 115 to determine whether the base station 115 has been relocated to a geographic region in which its transmission range, i.e., coverage area, is encompassed by or overlapping an exclusion zone. When the base station 115 is determined to be located in a non-interfering geographic region, the service center 125 transmits a first authorization signal to the base station 115 authorizing RF communication over the RF channel. When, alternatively, the base station 115 is located such that interference with a microwave station 105 could result, the service center 125 transmits a second authorization signal which prevents the base station 115 from communicating over the shared RF channel.

In this manner, the shared RF channel is efficiently utilized because the base stations 115 which share the RF channel are able to relocate to any geographic region wherein the RF transmission range does not overlap an exclusion zone. As a result, a base station user can conveniently relocate his assigned base station 115 when necessary, as long as the relocated base station 115 does not interfere with microwave stations 105 using the same RF channel. The RF communication system therefore provides for advantageous relocation of the base stations 115, unlike many prior art systems in which the location of a transmitting base station was fixed.

Figure 2:
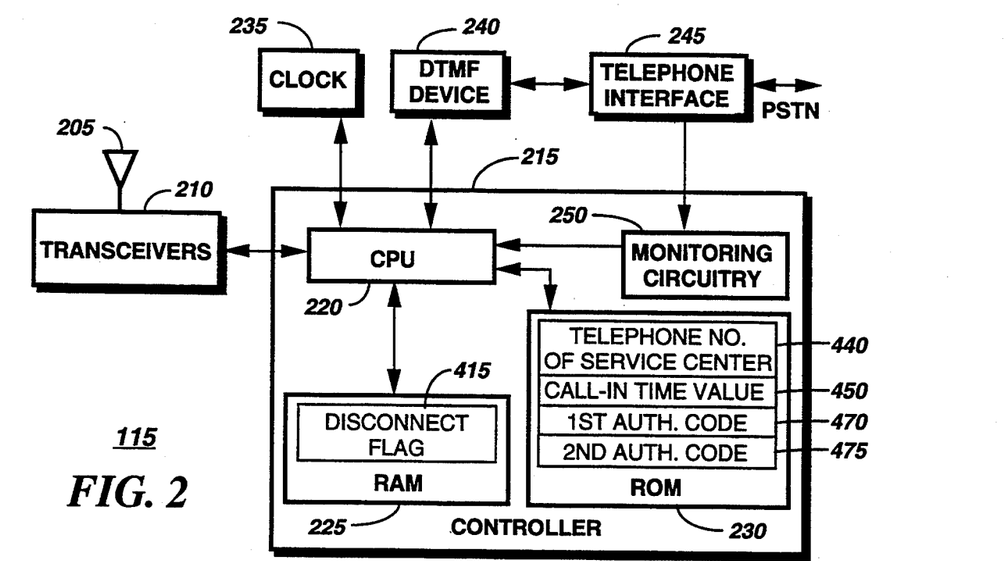
FIG. 2 is an electrical block diagram of a relocateable base station included within the radio frequency communication system of FIG. 1 in accordance with the preferred embodiment of the present invention.

Referring next to FIG. 2, an electrical block diagram of a relocateable base station 115 is depicted. In accordance with the preferred embodiment of the present invention, the base station 115 comprises antennas 205 configured to receive and transmit RF signals over the shared RF channel. The antennas 205 are coupled to RF transceivers 210 for encoding and decoding the communicated RF signals in a manner well known to one of ordinary skill in the art. The base station 115 further comprises a controller 215, which may, for example, be a microcomputer. Alternatively, the controller functions may be performed by hard-wired logic capable of performing equivalent operations. The controller 215 preferably includes a central processing unit 220 for controlling the operation of the base station 115. Additionally, the controller 215 includes a first memory, such as a random access memory (RAM) 225, for temporarily storing variables derived during operation of the base station 115 and a second memory, such as a read only memory (ROM) 230, for storing subroutines executed by the CPU 220 during operation of the base station 115.

Preferably coupled to the controller 215 is a clock 235 for generating real time values and a dual-tone, multi-frequency (DTMF) device 240 which is capable of both encoding and decoding DTMF signals. The DTMF signals are received from and, at the direction of the CPU 220, provided to a telephone interface 245 for accessing the PSTN 130 (FIG. 1) or other telephone network. Preferably, the telephone interface 245 is monitored by monitoring circuitry 250, which may be internal to the controller 215. The monitoring circuitry 250 is coupled to the CPU 220 for transmitting thereto a signal when the telephone interface 245 is determined to be disconnected from the PSTN 130.

According to the present invention, the telephone interface 245 includes a conventional telephone cord (not shown) for coupling to conventional telephone sockets. When the user of the base station 115 desires to relocate the base station 115, the telephone cord is unplugged from a first socket, thereby disconnecting the telephone interface 245 from the PSTN 130, and later plugged into a second socket to reconnect the telephone interface 245 to the PSTN 130. In this manner, the user can easily carry a base station 115 from one location to another and be reasonably assured that the base station 115 can be coupled to the PSTN 130 without complex adapters or connectors.

It may be appreciated by one of ordinary skill in the art that the base station 115 can be implemented, for example, through use of a conventional private branch exchange (PBX) coupled to conventional RF transceivers 210 and antennas 205, preferably by dedicated wirelines. In this situation, the transceivers 210 and antennas 205 would be physically separated from the other circuitry, e.g., the controller 215, clock 235, DTMF device 240, and telephone interface 245, which would be included in or closely associated with the PBX. Therefore, when the PBX and associated transceivers 210 and antennas 205 were relocated, the PBX would, as described above, initiate a call to the service center 125 to receive an appropriate authorization signal.

Figure 3:
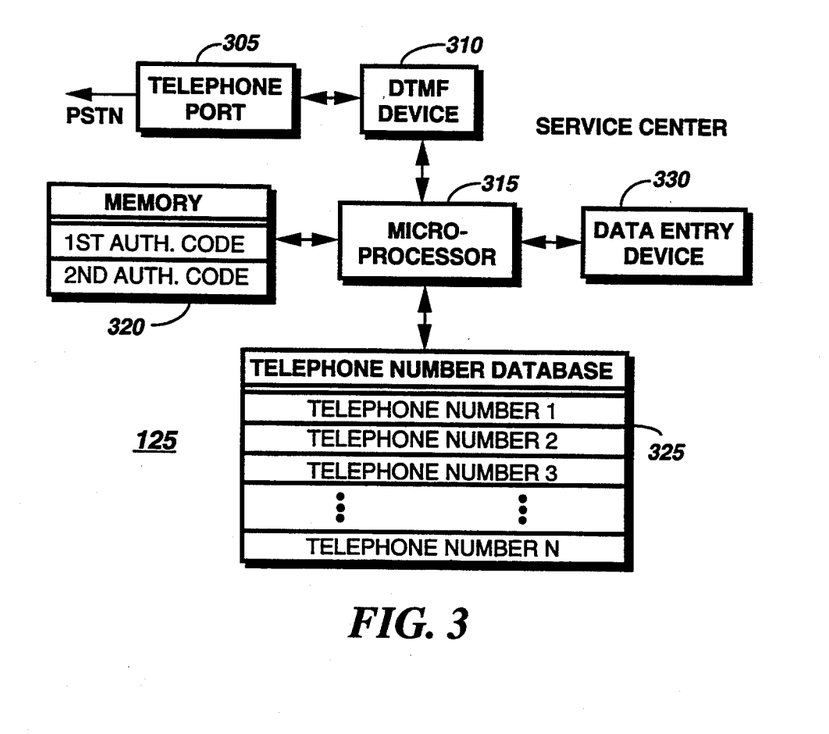
FIG. 3 is an electrical block diagram of a service center for authorizing the relocateable base station of FIG. 2 in accordance with the preferred embodiment of the present invention.

FIG. 3 is an electrical block diagram of the service center 125 which is coupled to the base station 115 through the PSTN 130. The service center 125 comprises a telephone port 305 for coupling to the PSTN 130 to allow communication thereover and a DTMF device 310 capable of encoding and decoding telephone signals, such as ANI information generated by the PSTN 130, communicated over the PSTN 130. The service center 125 further comprises processing circuitry, e.g., a microprocessor 315, which may be, for example, an MC68HC05 microcomputer manufactured by Motorola, Inc. of Schaumburg, Ill. Further included in the service center 125 is a memory 320 coupled to the microprocessor 315 for storing first and second authorization codes which are encoded by the DTMF device 310 and transmitted from the telephone port 305 as first and second authorization signals indicating, respectively, that RF communication over the RF channel is allowed or denied to the base station 115. The correct one of the first and second authorization codes is selected for transmission by reference to a database 325 coupled to the microprocessor 315. The database 325 is preferably utilized to store a listing of all telephone numbers of locations, including locations included within the exclusion zones, wherein the base station 115 could interfere with the microwave stations 105. The telephone numbers can be updated through use of a data entry device 330.

Figure 4:
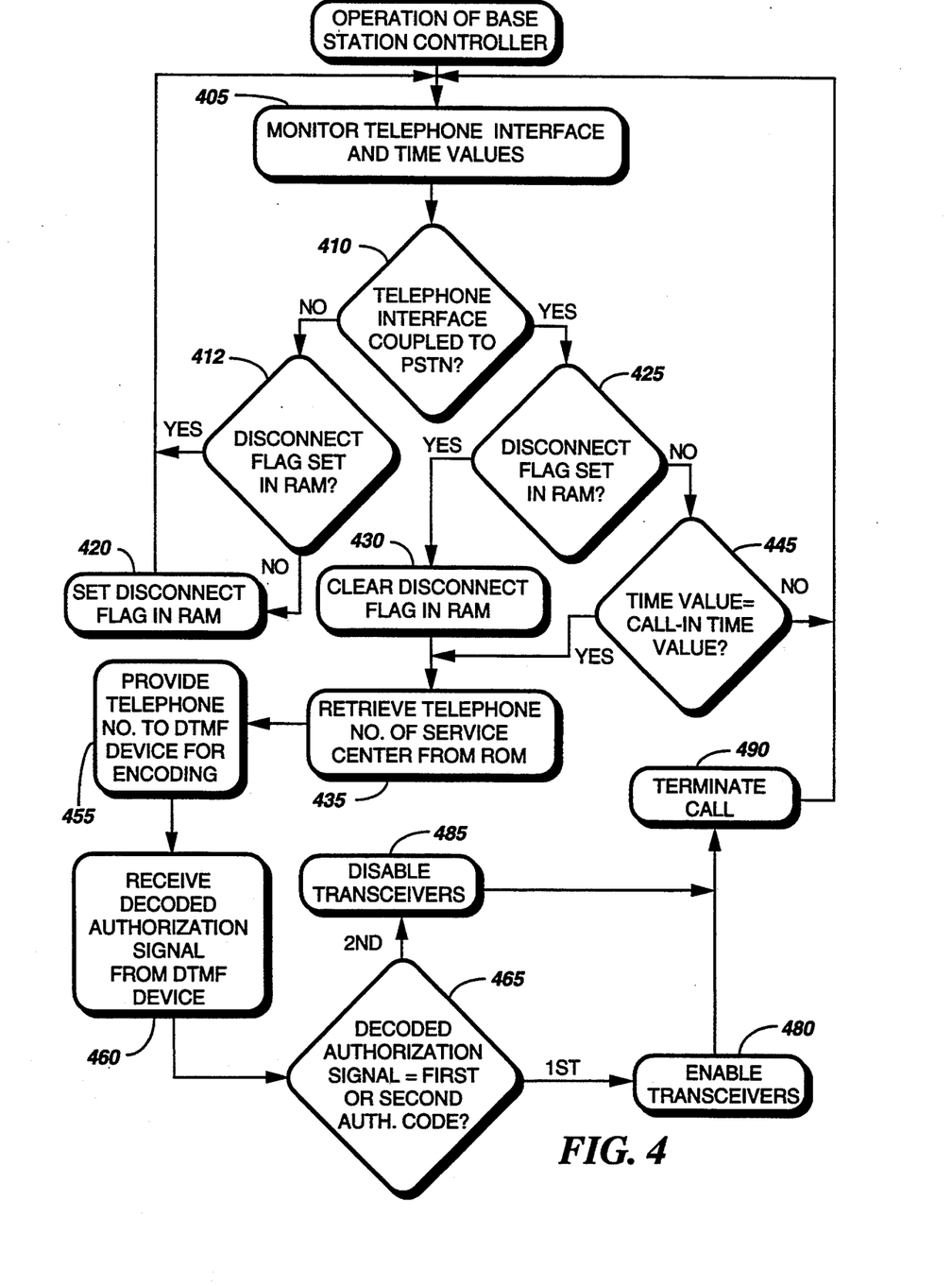
FIG. 4 is a flowchart depicting the operation of the controller included within the base station of FIG. 2 in accordance with the preferred embodiment of the present invention.

With reference to FIG. 4, a flowchart depicts the operation of the base station controller 215 (FIG. 2) in accordance with the preferred embodiment of the present invention. At step 405, the monitoring circuitry 250 monitors the telephone interface 245, and the CPU 220 monitors the time values generated by the clock 235. When, at step 410, the telephone interface 245 is determined to be disconnected from the PSTN 130 (FIG. 1), the CPU 220 consults the RAM 225 to determine, at step 412, whether a disconnect flag 415 (FIG. 2) is set, indicating that the telephone interface 245 has been previously disconnected from the PSTN 130. When the disconnect flag 415 is already set in the RAM 225, the telephone interface 245 and the time values continue to be monitored at step 405. When the disconnect flag 415 is not set, the CPU 220 sets, at step 420, the disconnect flag 415 in the RAM 225.

When, at step 410, the telephone interface 245 is determined to be coupled to the PSTN 130 and, at step 425, the disconnect flag 415 is set in the RAM 225, the CPU 220 clears, at step 430, the disconnect flag 415. Subsequently, the CPU 220 retrieves, at step 435, the telephone number 440 (FIG. 2) of the service center 125 which is stored in the ROM 230.

When, at step 410, the telephone interface 245 is determined to be coupled to he PSTN 130 and, at step 425, the disconnect flag 415 is not set, operation of the controller 215 resumes at step 405 unless, at step 445, the time value generated by the clock 235 is equivalent to a "call-in" time value 450 (FIG. 2) stored in the ROM 230. In this case, the CPU 220 also retrieves, at step 435, the telephone number 440 of the service center 125 from the ROM 230.

Subsequent to the telephone number 440 being retrieved, at step 435, the CPU 220 provides, at step 455, the telephone number 440 to the DTMF device 240 one digit at a time for encoding thereby into a telephone signal, which is transmitted to the PSTN 130 to call the service center 125. As mentioned above, the PSTN 130, which has ANI capabilities, provides the service center 125 with at least a portion of the telephone number from which the base station 115 is calling, in response to which the service center 125 transmits one of two authorization signals over the PSTN 130.

The CPU 220 receives the decoded authorization signal, i.e., the authorization code, at step 460, and determines, at step 465, whether the received authorization code is equivalent to the first or the second authorization code 470, 475 (FIG. 2) stored in the ROM 230. When the received authorization code is equivalent to the first authorization code 470, indicating that communication over the RF channel is allowed, the transceivers 210 (FIG. 2) are enabled, at step 480, and RF communication with handsets 120 (FIG. 1) near the base station 115 proceeds in a manner well known to one of ordinary skill in the art.

When the received authorization code is equivalent to the second authorization code 475 (FIG. 2), indicating that authorization for RF communication has been denied, the CPU 220 disables, at step 485, the transceivers 210, thereby preventing RF transmissions that could interfere with communication between the microwave stations 105 (FIG. 1). Thereafter, the call to the service center 125 over the PSTN 130 is terminated at step 490.

According to the above described embodiment, the base station 115 calls the service center 125 for authorization when the telephone interface 245 is coupled to the PSTN 130 after being disconnected from the PSTN 130, thereby preventing the base station 115 from being used without the proper authorization after being relocated. Additionally, the base station 115 preferably calls the service center 125 periodically, as described in reference to step 445, even when the telephone interface 245 has not been disconnected from the PSTN 130. The periodic calling of the service center 125 is intended to simply verify authorization when a base station 115 has not been relocated for a long period of time.

Figure 5:
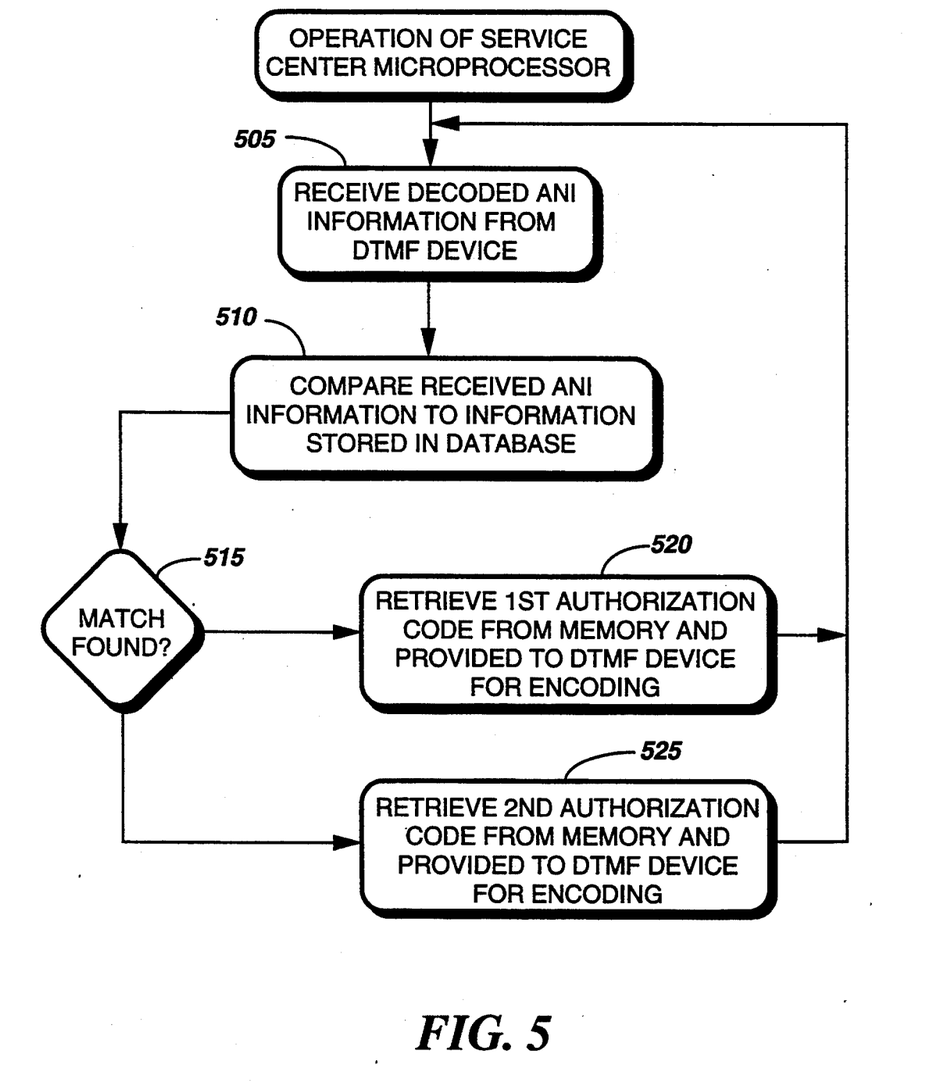
FIG. 5 is a flowchart depicting the operation of the microprocessor included in the service center of FIG. 3 in accordance with the preferred embodiment of the present invention.

Referring next to FIG. 5, a flowchart depicts the operation of the service center microprocessor 315 (FIG. 3). According to the present invention, the authorization function is begun when the telephone port 305 provides a telephone signal to the DTMF device 310 in response to a call from a base station 115. The telephone signal, which preferably comprises ANI information generated by the PSTN 130, is decoded by the DTMF device 310 and supplied, at step 505, to the microprocessor 315. The microprocessor 315 thereafter compares, at step 510, the ANI information to information stored in the database 325 (FIG. 3). As described above, the ANI information may comprise the telephone number from which the base station 115 is calling. In this situation, the telephone number is compared to a list of telephone numbers stored in the database 325 to determine whether it is one of the listed telephone numbers, which are telephone numbers within the exclusion zones.

Alternatively, the ANI information could simply comprise the telephone exchange from which the base station 115 is calling, and the database 325 could simply include a list of telephone exchanges indicative of regions wherein the base station coverage area could overlap or be included in any of the exclusion zones. This method would have the advantage of utilizing a much less cumbersome database 325 that would need to be updated less often. However, because the telephone exchanges would be unlikely to correspond exactly with the boundaries of the exclusion zones, the base stations 115 might easily be prevented from communicating over the RF channels in some regions where interference with the microwave stations 105 would not occur. As a result, the use of telephone exchanges, rather than telephone numbers, would less efficiently utilize the available RF spectrum.

When, at step 515, the telephone number, or, alternatively, the telephone exchange, included within the ANI information is not found in the database 325 (FIG. 3), indicating that the base station 115 is not in an exclusion zone, the microprocessor 315 retrieves, at step 520, the first authorization code from the memory 320 and provides it to the DTMF device 310. The DTMF device 310 subsequently encodes the first authorization code into a first authorization signal for transmission to the base station 115, in response to which the base station 115 is authorized to communicate over the RF channel.

When, at step 515, the telephone number or telephone exchange included in the ANI information is found in the database 325, the microprocessor 315 provides, at step 525, the second authorization code to the DTMF device 310. Upon reception by the base station 115, the second authorization code prevents communication over the RF channel, thereby preventing interference with any of the microwave stations 105 (FIG. 1).

In this manner, subscribers to the RF communication system are allowed the use of portable base stations 115, rather than the fixed base stations provided in prior art systems. As a result, a user can, when necessary, move his assigned base station 115 to a different location and communicate therefrom with portable handsets 120 as long as the base station 115 has not been moved to a location within an exclusion zone. The use of the base stations 115 and service center 125 therefore provides a convenient way for subscribers to share an existing RF channel without interfering with stations, such as the microwave stations 105, which also communicate over the RF channel.

Figure 6:
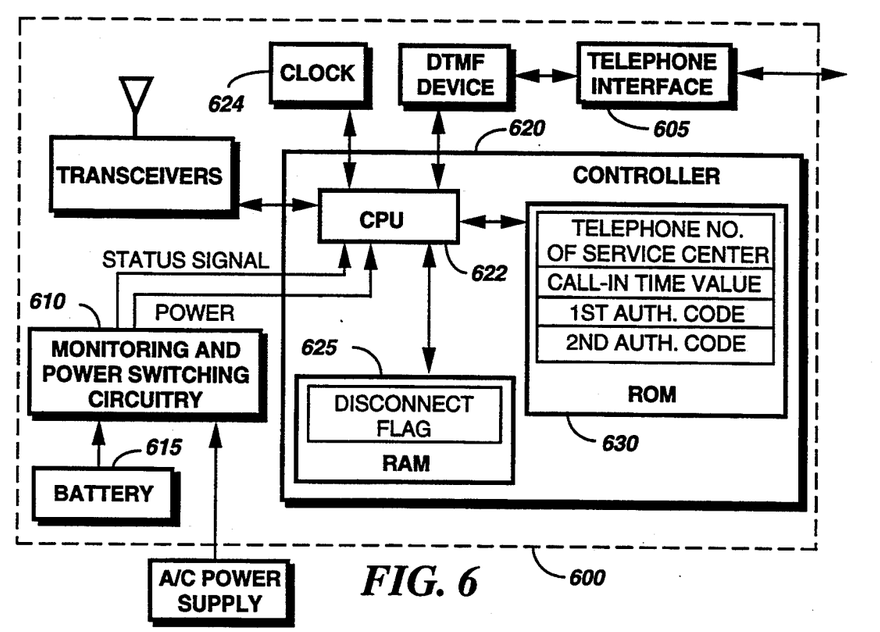
FIG. 6 is an electrical block diagram of a relocateable base station in accordance with a first alternate embodiment of the present invention.

FIG. 6 is a block diagram of a base station 600 in accordance with a first alternate embodiment of the present invention. This base station 600 is similar to the base station 115 described in reference to FIGS. 2 and 4, but, rather than monitoring a telephone interface 605, the base station 600 comprises monitoring and power switching circuitry 610 for monitoring A/C power provided thereto from an A/C power supply (not shown), which normally powers the base station 600, and for generating a signal when the A/C power is interrupted. Coupled to the monitoring and power switching circuitry 610 is a backup battery 615 for supplying power to at least portions of the base station 600, such as a controller 620, when the A/C power is interrupted. As in the base station 115 (FIG. 2) according to the preferred embodiment, the controller 620 of the base station 600 includes a CPU 622 for controlling the operation of the base station 600, a RAM 625 for storing a disconnect flag, and a ROM 630 for storing the telephone number of the service center 125 (FIG. 3), a "call-in" time value, and the first and second authorization codes.

Figure 7:
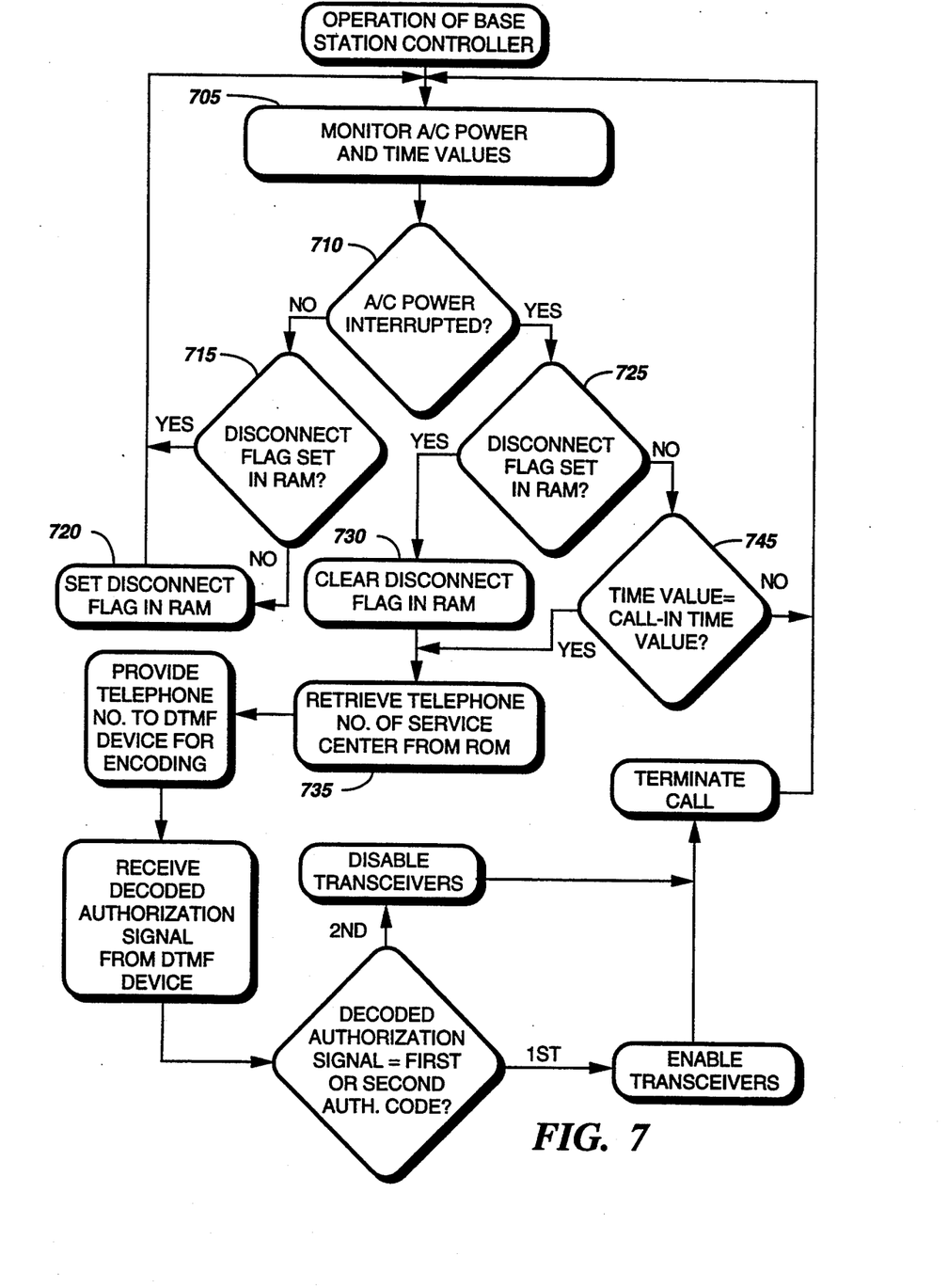
FIG. 7 is a flowchart depicting the operation of the controller included within the base station of FIG. 6 in accordance with the first alternate embodiment of the present invention.

Referring next to FIG. 7, a flowchart depicts the operation of the controller 620 included in the base station 600 in accordance with the first alternate embodiment of the present invention. Initially, at step 705, the monitoring and power switching circuitry 610 monitors the A/C power, and the CPU 622 monitors time values provided thereto from a clock 624 (FIG. 6). When, at step 710, the A/C power is not interrupted, the CPU 622 references the RAM 625 to determine, at step 715, whether the disconnect flag has been set. When the disconnect flag is set, operation of the CPU 622 resumes at step 705. Otherwise, the CPU 622 sets, at step 720, the disconnect flag in the RAM 625.

When, at step 710, the A/C power is interrupted, such as when the base station 600 is being relocated, and, at step 725, the disconnect flag is set, the CPU 622 clears, at step 730, the disconnect flag. Subsequently, the CPU 622 retrieves, at step 735, the telephone number of the service center 125 which is stored in the ROM 630. When, at step 710, the A/C power is interrupted, and, at step 725, the disconnect flag is not set, operation of the controller 622 resumes at step 705 unless, at step 745, the time value generated by the clock 624 is equivalent to the call-in time value stored in the ROM 630. In this case, the CPU 622 also retrieves, at step 735, the telephone number of the service center 125.

In accordance with this first alternate embodiment, further operation of the base station controller 622 proceeds similarly to that described in steps 455 through 490 of FIG. 4. In this manner, the base station 600 places a call to the service center 125 when A/C power has been interrupted and subsequently restored or when a periodic time period has expired.

It will be appreciated by one of ordinary skill in the art that combinations of the above described embodiments can be implemented in a base station for use in the RF communication system. For example, if a base station includes the monitoring circuitry 250 (FIG. 2), the monitoring and power switching circuitry 610 (FIG. 6) and the backup battery 615, the base station could be designed to place a call to the service center 125 only when a telephone interface has been reconnected to the PSTN 130 after being disconnected from the PSTN 130 and when A/C power has been restored after interruption. Because both the telephone interface and an A/C power outlet must be disconnected to relocate the base station, the base station would reduce the number of unnecessary calls to the service center 125 which might be placed, for instance, after a power outage or after telephone service interruptions.

Figure 8:
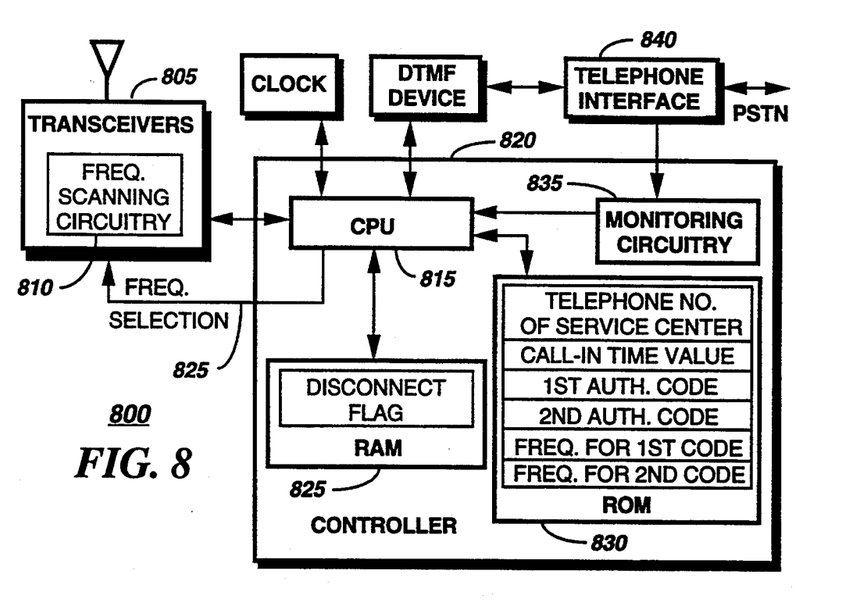
FIG. 8 is an electrical block diagram of a relocateable base station in accordance with a second alternate embodiment of the present invention.

A second alternate embodiment of the present invention is envisioned in which the portable handsets 120 comprise frequency scanning apparatus for use in system such as a conventional CT-2 system. A base station 800 in accordance with the second alternate embodiment is depicted in FIG. 8. The base station 800 preferably comprises transceivers 805 which include frequency control circuitry 810 of a type well known to one of ordinary skill in the art. A CPU 815 included in a base station controller 820 provides frequency selection signals to the transceivers 805 via a frequency selection bus 825 coupled between the transceivers 805 and the CPU 815. The controller 820 further comprises RAM 825 for storing a disconnect flag set by the CPU 815 and a ROM 830 for storing, in addition to the parameters described in reference to FIGS. 2 and 4, first and second frequencies associated, respectively, with the first and second authorization codes stored in the ROM 830. Additionally, the controller 820 includes monitoring circuitry 835 for monitoring a telephone interface 840 and generating a signal when the telephone interface 840 is determined to be disconnected from the PSTN 130 (FIG. 1).

Figure 9:
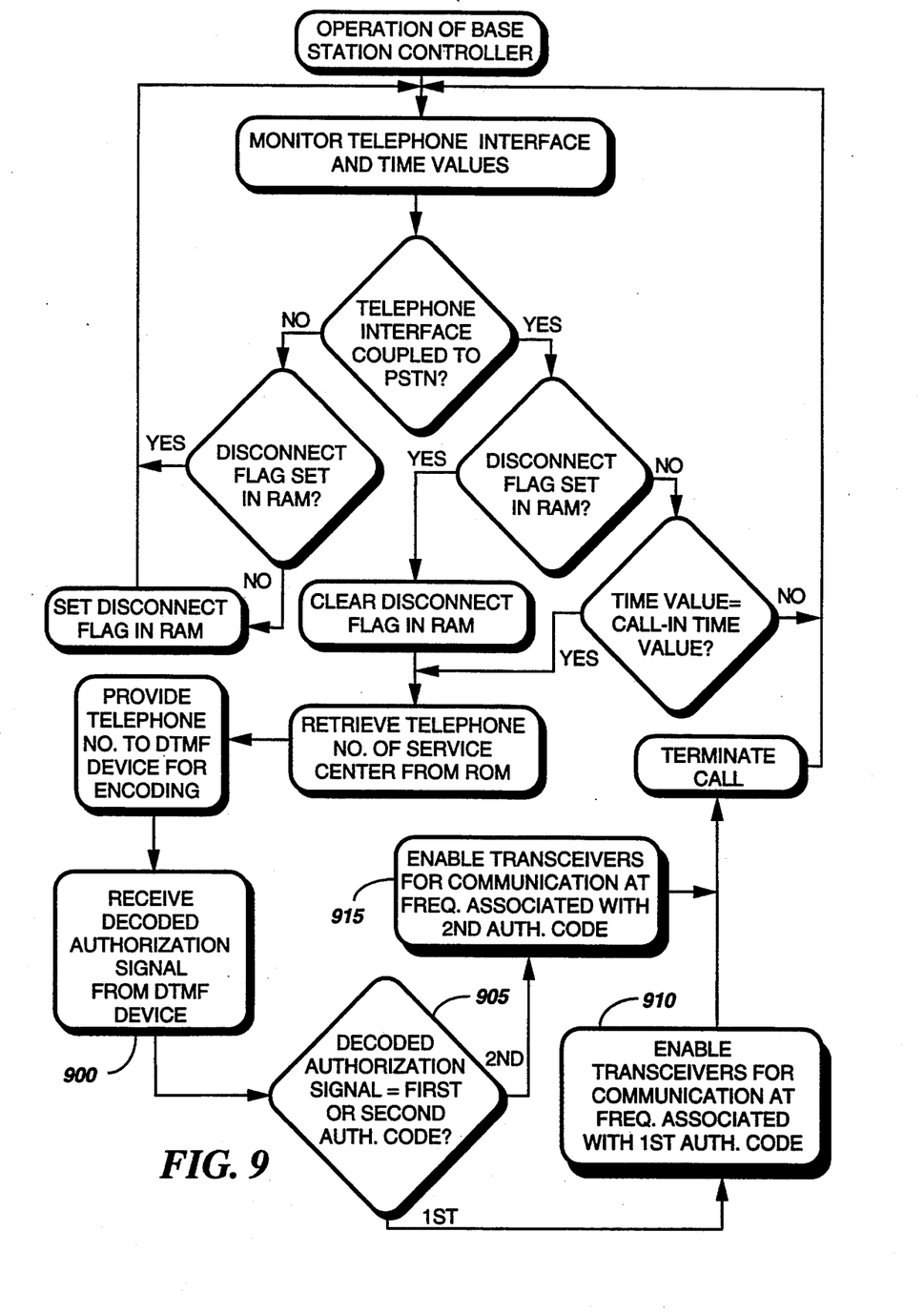
FIG. 9 is a flowchart depicting the operation of the controller included within the base station of FIG. 8 in accordance with the second alternate embodiment of the present invention.

FIG. 9 is a flowchart depicting the operation of the base station controller 820 (FIG. 8). In accordance with the second alternate embodiment, the controller 820 proceeds as described in FIG. 4 until, at step 900, the CPU 815 receives the decoded authorization signal and determines, at step 905, whether the decoded authorization signal is equivalent to the first or second authorization code. When the first authorization code is received, indicating that communication over the RF channel is allowed, the CPU 815 enables, at step 910, the transceivers 805 for communication over the RF channel. This is preferably accomplished when the CPU 815 references the ROM 830 to determine the frequency associated with the first authorization code, and therefore associated with the RF channel, and then provides an appropriate frequency selection signal to the transceivers 805. When the second authorization code is received, the CPU enables, at step 915, the transceivers 805 for communication on a different frequency associated with the second authorization code by providing a frequency selection signal indicative of the different frequency to the transceivers 805. In response to reception of the frequency selection signal, the frequency control circuitry 810 (FIG. 8) is adjusted to the frequency assigned by the CPU 815 and communication with the portable handsets 120 is established over the assigned frequency.

In accordance with the second alternate embodiment, RF communication between the base station 800 and portable handsets 120 is allowed even when the base station 800 is located within an exclusion zone. However, when the base station is located in an exclusion zone, communication is established over an RF channel which is different from that used by the microwave stations 105 (FIG. 1), thereby preventing interference with the microwave stations 105. In this manner, the base station 800 may be conveniently utilized in all regions encompassed by the RF communication system, and users of portable handsets 120 are not isolated from communication with the base station 800 when the base station 800 is located in an exclusion zone. This base station 800 and the portable handsets 120 communicating therewith, however, may require more expensive and complex circuitry for implementation of the frequency control circuitry 810 and the frequency scanning apparatus for use in the portable handsets 120.

Figure 10:
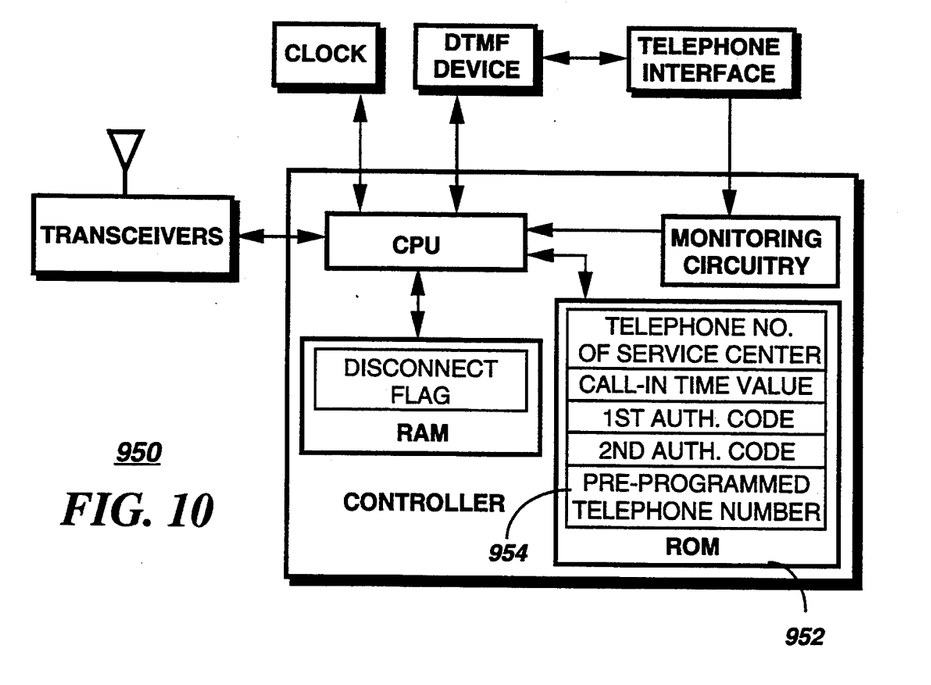
FIG. 10 is an electrical block diagram of a relocateable base station in accordance with a third alternate embodiment of the present invention.

FIG. 10 is a block diagram of a base station 950 in accordance with a third alternate embodiment of the present invention. This base station 950 includes in the ROM 952 a pre-programmed telephone number 954 which is loaded when the base station 950 is purchased. The pre-programmed telephone number 954 preferably corresponds to the telephone number from which the base station 950 will place calls to a service center. In this alternate embodiment, the base station 950 still calls the service center after disconnection from the PSTN 130 or after expiration of a time period. However, when the base station 950 places the call, the pre-programmed telephone number 954, as well as the ANI information, is provided to a service center. The service center then provides a first authorization code, which allows communication, to the base station 950 when the pre-programmed telephone number 954 is equivalent to the telephone number from which the base station 950 is calling.

Figure 11:
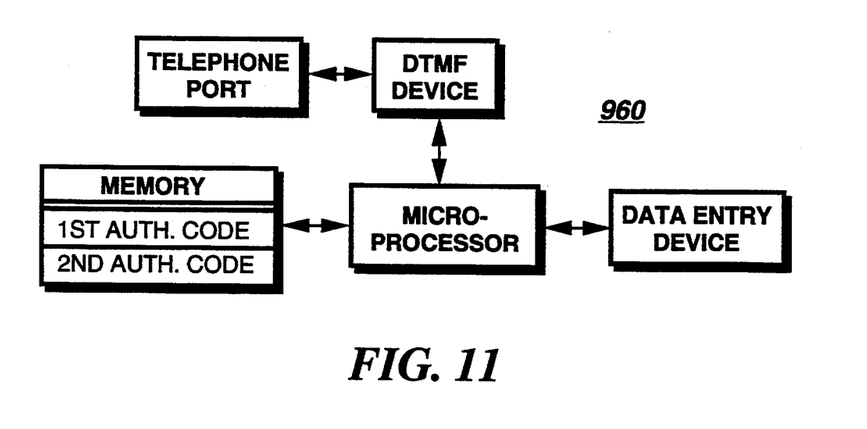
FIG. 11 is an electrical block diagram of a service center for use with the base station of FIG. 10 in accordance with the third alternate embodiment of the present invention.

Referring next to FIG. 11, a service center 960 according to the third alternate embodiment is depicted. The service center 960 is intended for use with the base station 950 of FIG. 10. According to this alternate embodiment, the service center 960 does not include a database listing telephone numbers or telephone exchanges included within exclusion zones. Instead, the service center 960 bases its authorization entirely upon whether or not the pre-programmed telephone number 954 (FIG. 10) matches the telephone number provided in the ANI information. This method has the advantage of allowing a much simpler service center 960 which does not have to be updated periodically. Additionally, because the base station 950 can only be used at a single telephone number, stolen base stations 950 become inoperable. However, in this alternate embodiment, the base stations 950 cannot be relocated by a subscriber and the RF spectrum is less efficiently utilized.

In summary, the RF communication system according to the preferred embodiment of the present invention includes base stations which can be easily and conveniently relocated by a subscriber. The base stations share an RF channel with stationary point-to-point communication devices, such as microwave stations, which communicate on the RF channel over predetermined geographic areas, termed "exclusion zones". Therefore, the base stations can communicate on the RF channel in any geographic region, excepting the exclusion zones, without interfering with the microwave stations. A service center included in the RF communication system controls the communication capabilities of the base stations, which are coupled to the service center by a telephone network having ANI capabilities. According to the preferred embodiment of the present invention, the service center automatically receives from the telephone network the telephone number from which a base station is calling and determines therefrom whether the base station is located in an exclusion zone. The service center then authorizes the base station for RF communication over the RF channel when it is not located in an exclusion zone. A base station may therefore be relocated any number of times and continue to communicate over the RF channel unless it has been inadvertently relocated to a region within an exclusion zone.

It may be appreciated by now that there has been provided a frequency sharing scheme for relocateable base stations that prevents interference between users of two different communication systems sharing the same RF channel.

What is claimed is:

1. A method for sharing a radio frequency channel among stationary communication devices for communicating over predetermined geographic areas and at least one base station capable of being relocated among a plurality of geographic regions, wherein the at least one base station is coupled to a service center via a telephone network having automatic number identification (ANI) capabilities, the method comprising the steps of:
    the at least one base station accessing the telephone network to couple to the service center;
    the telephone network transmitting to the service center information indicative of at least a portion of a telephone number from which the at least one base station is calling;
    the service center determining therefrom whether the base station is located within any of the predetermined geographic areas; and
    the service center providing a first authorization signal to the at least one base station over the telephone network when the at least one base station is not located within any of the predetermined geographic areas, wherein the first authorization signal indicates that authorization of radio frequency communication over the radio frequency channel is allowed.

2. The method according to claim 1, further comprising the step of:
    the at least one base station communicating over the radio frequency channel in response to reception of the first authorization signal.

3. The method according to claim 1, further comprising the step of:
    the service center providing a second authorization signal to the at least one base station when the at least one base station is located within any of the predetermined geographic areas, wherein the second authorization signal indicates that authorization of radio frequency communication over the radio frequency channel is denied.

4. The method according to claim 1, wherein the accessing step comprises the steps of:
    the at least one base station automatically accessing the telephone network to periodically couple to the service center.

5. The method according to claim 1, wherein the accessing step comprises the steps of:
    the at least one base station disconnecting from the telephone network;
    the at least one base station reconnecting to the telephone network; and
    the at least one base station automatically accessing the telephone network to couple to the service center in response to reconnecting to the telephone network.

6. The method according to claim 1, wherein the accessing step comprises the steps of:
    the at least one base station disconnecting from a power supply for providing power thereto;
    the at least one base station reconnecting to the power supply; and
    the at least one base station automatically accessing the telephone network to couple to the service center in response to reconnecting to the power supply.

7. The method according to claim 1, wherein the transmitting step comprises the step of:
    the telephone network transmitting to the service center a telephone number from which the at least one base station is calling.

8. The method according to claim 7, wherein: the determining step comprises the step of:
    the service center comparing the telephone number with stored telephone numbers which are associated with geographic regions included within the predetermined geographic areas; and the providing step comprises the step of:
    the service center providing the first authorization signal to the at least one base station over the telephone network when the telephone number transmitted by the telephone network is not equivalent to at least one of the stored telephone numbers, wherein the first authorization signal indicates that authorization of radio frequency communication over the radio frequency channel is allowed.

9. The method according to claim 1, wherein the transmitting step comprises the step of:
    the telephone network transmitting to the service center a telephone exchange number from which the at least one base station is calling.

10. The method according to claim 9, wherein: the determining step comprises the step of:
    the service center comparing the telephone exchange number with stored telephone exchange numbers which are associated with geographic regions included within the predetermined geographic areas; and the providing step comprises the step of:
    the service center providing the first authorization signal to the at least one base station over the telephone network when the telephone exchange number transmitted by the telephone network is not equivalent to at least one of the stored telephone exchange numbers, wherein the first authorization signal indicates that authorization of radio frequency communication over the radio frequency channel is allowed.

11. A radio frequency communication system coupled to a telephone network for communication thereover, the telephone network having automatic number identification (ANI) capabilities, wherein the radio frequency communication system shares a radio frequency channel with stationary communication devices which communicate on the radio frequency channel over predetermined geographic areas, the radio frequency communication system comprising:

at least one relocateable base station for calling the service center over the telephone network and for receiving therefrom one of first and second authorization signals indicating, respectively, that authorization of radio frequency communication over the radio frequency channel is allowed or denied, wherein the at least one relocateable base station comprises a transceiver for communicating over the radio frequency channel in response to reception of the first authorization signal; and a service center for receiving from the telephone network information indicative of at least a portion of a telephone number from which the at least one relocateable base station is calling and for determining therefrom whether the at least one relocateable base station is located within any of the predetermined geographic areas, wherein the service center transmits the first authorization signal to the at least one relocateable base station when the at least one relocateable base station is not located within any of the predetermined geographic areas.

12. The radio frequency communication system according to claim 11, wherein the at least one relocateable base station further comprises:

a memory for storing a predetermined telephone number associated with the service center; and accessing means coupled to the memory for calling the predetermined number over the telephone network and for receiving in response thereto the one of the first and second authorization signals over the telephone network.

13. The radio frequency communication system according to claim 12, wherein the accessing means comprises:

dialing means for dialing the predetermined telephone number; and a controller coupled to the dialing means for determining whether the dialing means is coupled to the telephone network, wherein the controller provides the predetermined telephone number to the dialing means in response to determining that the dialing means has been coupled to the telephone network subsequent to being disconnected from the telephone network.

14. The radio frequency communication system according to claim 12, wherein the accessing means comprises:

dialing means for dialing the predetermined telephone number; and monitoring means coupled to the dialing means for monitoring power supplied thereto by a power supply, wherein the monitoring means provides the predetermined telephone number to the dialing means in response to determining that the power provided by the power supply has been restored subsequent to being interrupted.

15. The radio frequency communication system according to claim 12, wherein the accessing means comprises:

dialing means for dialing the predetermined telephone number; and a controller coupled to the dialing means and the memory for providing the predetermined telephone number to the dialing means.

16. The radio frequency communication system according to claim 15, wherein the at least one relocateable base station further comprises:

a clock coupled to the controller for generating time values, wherein the controller provides the predetermined telephone number to the dialing means in response to expiration of a predetermined amount of time.

17. The radio frequency communication system according to claim 11, wherein the service center comprises:

a database for storing information associated with the predetermined geographic areas over which the stationary communication devices communicate;

a telephone port for receiving the information indicative of at least a portion of the telephone number from which the at least one relocateable base station is calling; and a processor coupled to the telephone port and the database for comparing the information indicative of at least a portion of the first telephone number to the information stored in the database to determine whether the at least one base station is located within any of the predetermined geographic areas and for generating the first authorization signal when the at least one base station is determined not to be located within any of the predetermined geographic areas.

* * * * *